FEEDBACK ARRANGEMENTS FOR TRANSFORMING ISOLATOR AND GYRATOR CIRCUITS INTO SIMILAR OR OPPOSITE TYPE OF CIRCUIT

Filed Aug. 4, 1964 4 Sheets-Sheet 1

INVENTOR
HEINZ M. SCHLICKE

BY Arnold J. Ericsen

ATTORNEY

INVENTOR
HEINZ M. SCHLICKE

BY [signature]

ATTORNEY

FEEDBACK ARRANGEMENTS FOR TRANSFORMING ISOLATOR AND GYRATOR CIRCUITS INTO SIMILAR OR OPPOSITE TYPE OF CIRCUIT

Filed Aug. 4, 1964 4 Sheets-Sheet 3

INVENTOR
HEINZ M. SCHLICKE

BY Arnold J. Ericsen

ATTORNEY

INVENTOR
HEINZ M. SCHLICKE

BY Arnold J. Ericsen

ATTORNEY

United States Patent Office 3,300,738

Patented Jan. 24, 1967

3,300,738

FEEDBACK ARRANGEMENTS FOR TRANSFORMING ISOLATOR AND GYRATOR CIRCUITS INTO SIMILAR OR OPPOSITE TYPE OF CIRCUIT

Heinz M. Schlicke, Fox Point, Wis., assignor to Allen-Bradley Company, Milwaukee, Wis., a corporation of Wisconsin Filed Aug. 4, 1964, Ser. No. 387,381
8 Claims. (Cl. 333—24.1)

Figure 1:
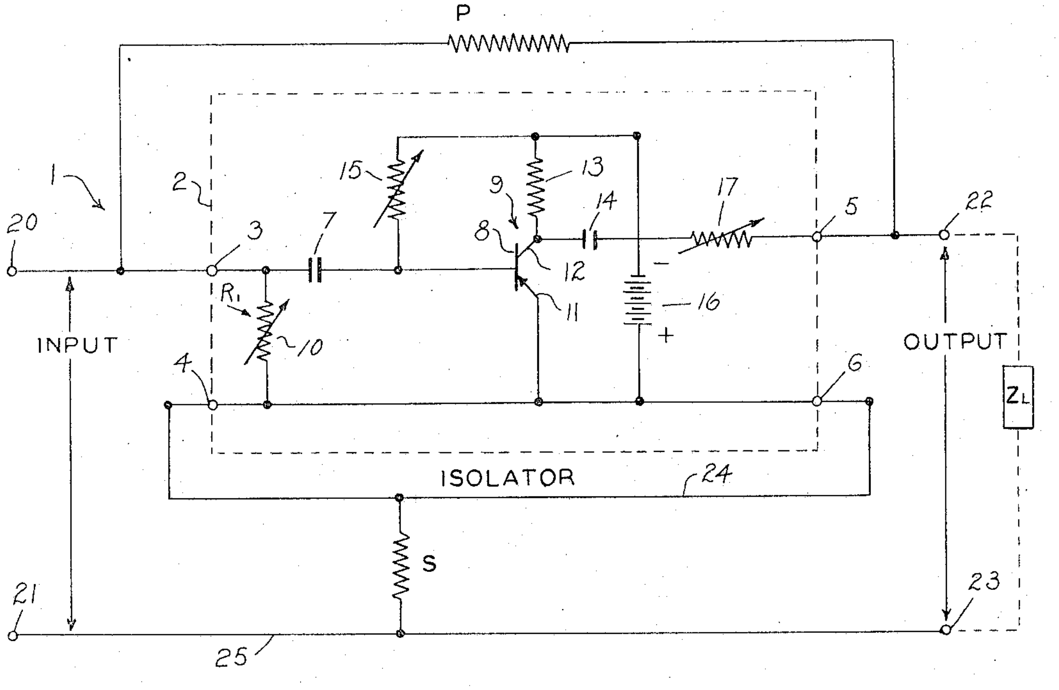

The present invention relates to electronic circuitry having an initial four pole network and which by proper selection of resistive feedback provisions is transformed into circuitry having similar or opposite electrical characteristics. More specifically, the invention provides circuitry which initially has electrical characteristics corresponding to either a gyrator or isolator and which by the proper combination of negative or/and positive feedback parameters is transformed so that its electrical characteristics correspond to a gyrator, isolator or reverse isolator.

In this invention a gyrator will be defined as a four pole electrical network which when looking into the input terminals of the network changes a load impedance connected to the output terminals of the network to the inverse of the load impedance multiplied by the square of the gyrating impedance, i.e. the impedance characterizing the gyrator. The present invention is primarily interested in gyrators having a characterizing impedance that is predominently resistive. Thus, letting R represent the inherent gyrating impedance, $Z_L$ the load impedance and $Z_{IN}$ the input impedance when looking into the gyrator input terminals, $$Z_{IN}=\frac{R^2}{Z_L}$$

An isolator will be understood to be a four pole device which transfers electrical energy in one direction only. Depending on the direction of energy flow one may characterize an isolator as a forward or reverse isolator.

A device having gyrator-isolator characteristics will be understood to be a device having characteristics similar to either a gyrator or an isolator.

A negative resistance device will be understood to be a device having a voltage-current curve characteristic wherein the slope of voltage to current ratio is negative over at least some portion of the curve. Examples of such devices may include tunnel diodes, PNPN diodes, unijunction transistors, and double injection diodes.

Also in the description, four pole networks include networks having a pair of input terminals and a pair of output terminals, and also includes networks which have one input terminal connected in common with one output terminal, either internally or externally.

Furthermore, for those who are more familiar with matrix algebra, a gyrator having a predominantly resistive characterizing impedance is a four pole device which has an impedance matrix $$||Z||=\begin{Vmatrix}0 & R\\ R & 0\end{Vmatrix}$$

with R as previously defined. An isolator is a four pole device which when possessing a predominantly resistive input impedance has an impedance matrix $$||Z||=\begin{Vmatrix}R_1 & 0\\ 2R_1 & -R_1\end{Vmatrix}$$

with $R_1$ representing the input impedance of the isolator. A reverse isolator has an impedance matrix $$||Z||=\begin{Vmatrix}R_1 & -2R_1\\ 0 & -R_1\end{Vmatrix}$$

and a reverse isolator with a negative sign an impedance matrix $$||Z||=\begin{Vmatrix}-R_1 & -2R_1\\ 0 & R_1\end{Vmatrix}$$

These matrix definitions are assuming that the four pole network is linear and that the positive direction of input current is towards the four pole network and the positive direction of output current is out of the output terminals of the four pole network. The input voltage is measured as a voltage drop from the input terminal from which the input current is defined to the other input terminal. The output voltage is measured as a voltage drop from the input terminal from which the output current is defined. See Schlicke, H. M., Dr.-Ing., Essentials of Dielectromagnetic Engineering, Ch. IV., John Wiley & Sons, 1961.

There are numerous applications, for example in the analog field, where it is necessary to have a network possessing gyrator characteristics part of the time and isolator characteristics during another period. Likewise, many electrical applications demand that there be isolators which transfer energy in one direction part of the time and then a second group of isolators which transfer energy in the opposite direction during another period. Commonly, applications with these demands are met by incorporating numerous individual circuits, each of which has one distinct characteristic. When the specific application demands the characteristic inherent of a specific circuit, that circuit is switched into the network. However, during the remainder of the time the circuit remains idle while other circuits are switched in and out to perform their specific function.

The circuitry of the present invention teaches, that rather than having a plurality of gyrator isolator and reverse isolator networks, that by taking a single gyrator-isolator network and providing or altering the parallel or series feedback provisions, a new gyrator-isolator network having a different characteristic can be realized. The circuitry of this invention teaches that by providing the initial gyrator-isolator circuit with a negative resistive feedback circuit, either series, parallel or series-parallel, depending on the nature of the initial circuit and the demands of the application, a transformation in electrical characteristics can be made. As a result, the ultimate circuit performs as though the original circuit were completely rewired or replaced.

The invention permits, that if those practicing the invention select proper materials so that the resistance of the feedback paths can be changed by other than physical means, e.g. by light or electrical fields, the transformation may be made instantly and without any physical contact to the network. Accordingly, the circuitry of this invention has important utility in situations where it may be difficult to make either a gyrator or isolator circuit. The present circuitry permits one to make the less difficult circuit and then by incorporating external resistive parameters, the characteristics of the circuit more difficult to construct are realized. For example, presently it is more difficult to make microminiature gyrators than microminiature isolators. In accordance with the present invention an insolator circuit incorporating feedback provisions can be made, and then by changing the values of the feedback provisions, the circuit performs as a gyrator.

Accordingly, an object of the present invention is to provide a flexible and versatile electronic circuit network which by the external switching of one or two parameters in the network changes the network so that the network has entirely different electrical characteristics.

Another object of the present invention is to provide flexible and versatile electronic circuit networks initially having gyrator-isolator electrical characteristics and which in combination with external series or/and parallel negative resistive feedback can be transformed to circuitry having the same or opposite gyrator-isolator characteristics.

A further object is to provide flexible and versatile electronic circuit networks which by the external switching of one or two parameters is transformed into circuitry with a different electrical characteristic and which by external switching a second time can be transformed into the network with the original characteristics or to a distinct third characteristic.

The foregoing and other objects will appear in the description to follow. In the description, reference is made to the accompanying drawings which form a part hereof in which there is shown by way of illustration specific embodiments in which this invention may be practiced. These embodiments will be described in sufficient detail to enable those skilled in the art to practice this invention, but it is to be understood that other embodiments of the invention may be used and that changes may be made in the embodiments without deviation from the scope of the invention. Consequently, the following detailed description is not to be taken in a limiting sense; instead, the scope of the present invention is best defined by the appended claims.

Figure 2A:
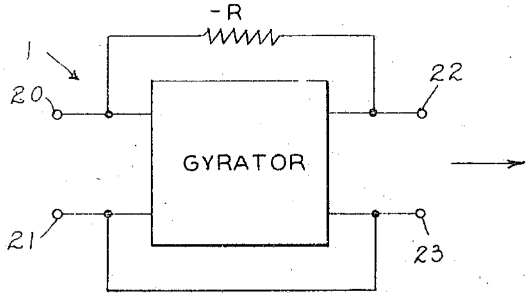
Figure 2B:
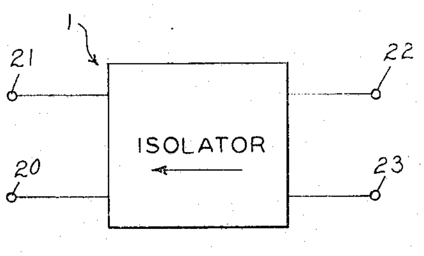
Figure 3:
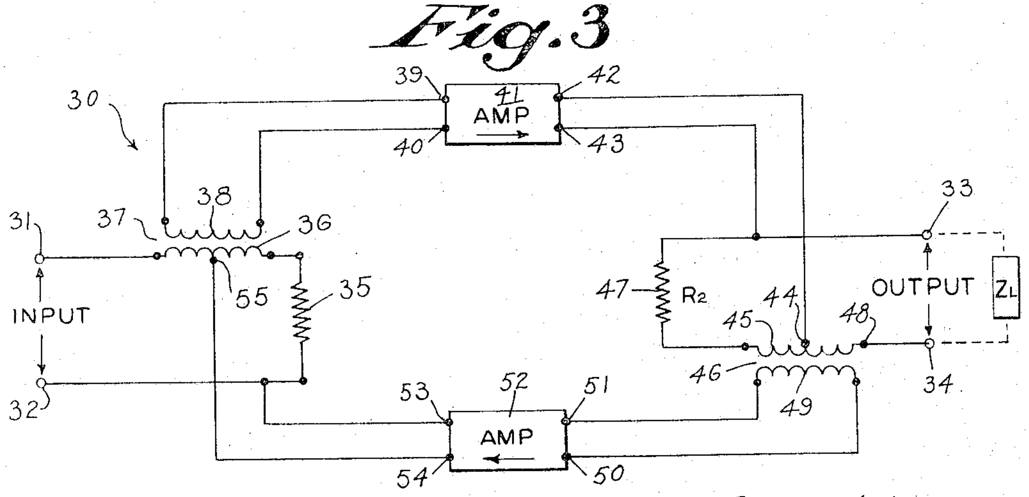
Figure 4A:
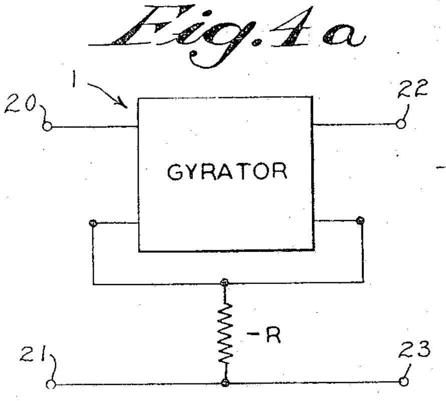
Figure 4B:
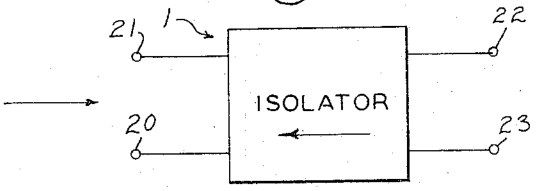
Figure 5A:
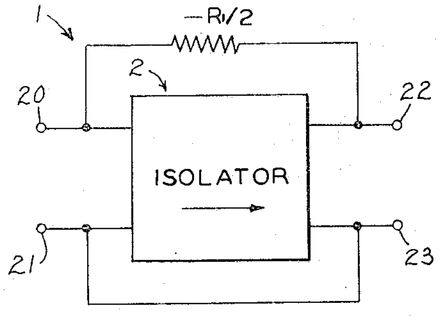
Figure 5B:
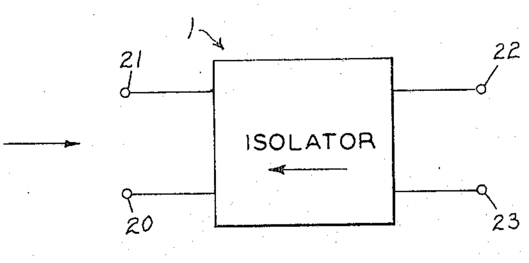
Figure 6A:
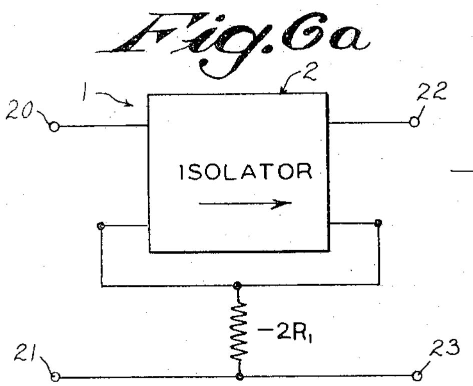
Figure 6B:
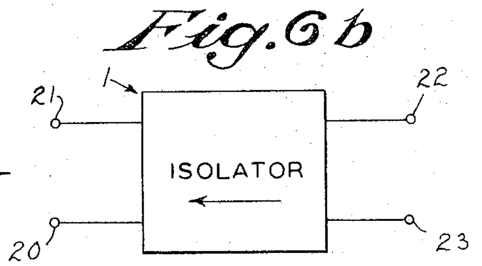
Figure 7A:
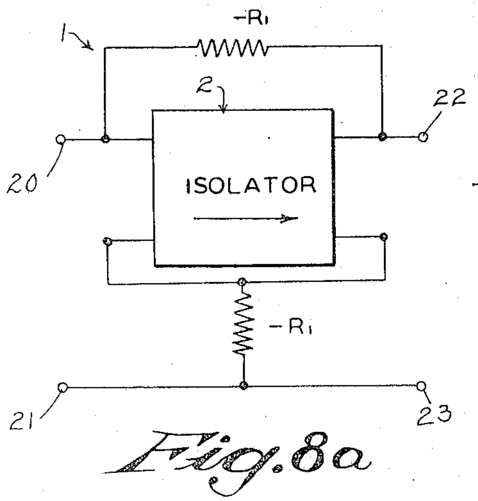
Figure 7B:
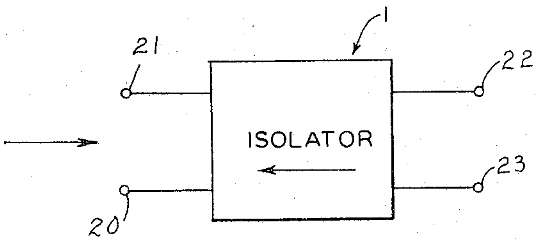
Figure 8A:
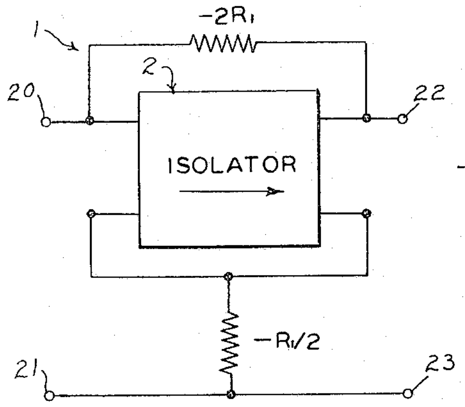
Figure 8B:
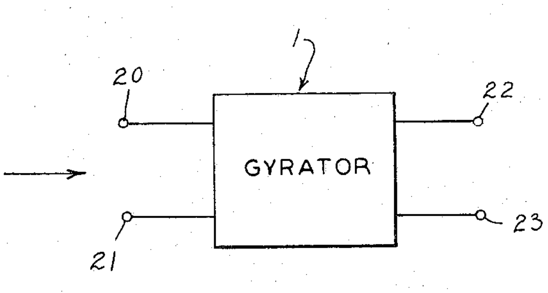
Figure 9A:
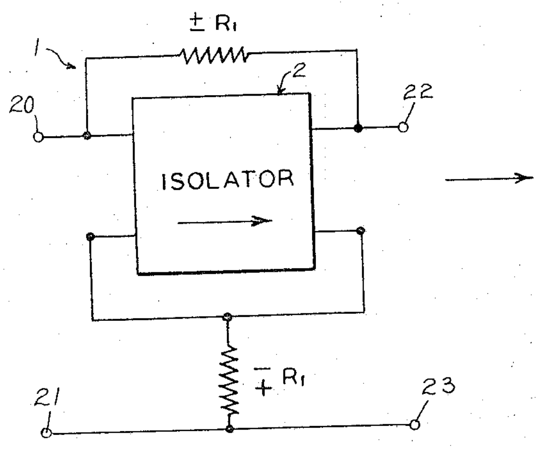
Figure 9B:
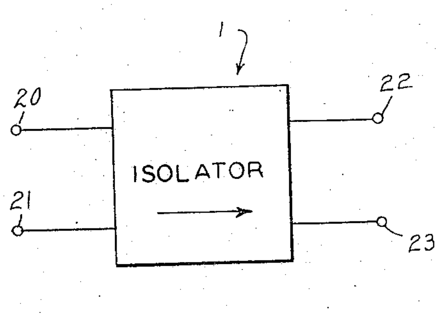
Figure 10A:
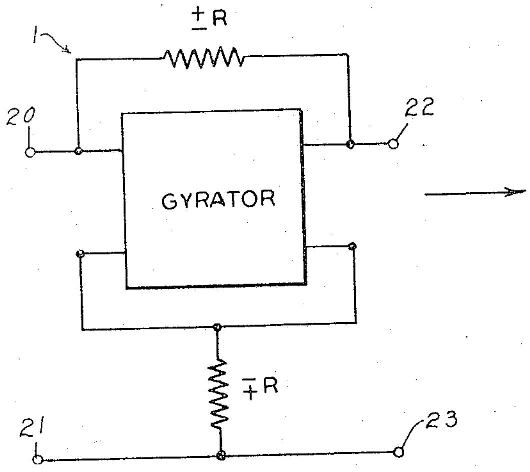
Figure 10B:
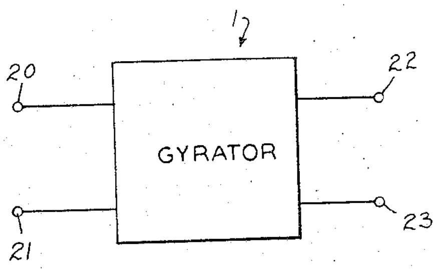

In the drawings:

FIG. 1 illustrates a diagrammatic wiring diagram of a four pole circuit network comprising a conventional isolator circuit, a resistive parallel feedback path and a resistive series feedback path;

FIGS. 2*a* and 2*b* illustrate that by proper selection of the values of the feedback paths a gyrator can be transformed to a negative reverse isolator;

FIG. 3 illustrates a diagrammatic wiring diagram of a four pole gyrator circuit;

FIGS. 4*a* and 4*b* illustrate feedback provisions different than those in FIGS. 2*a* and 2*b* whereby a gyrator may be transformed to a negative reverse isolator;

FIGS. 5*a* and 5*b* illustrate that by proper selection of the values of the feedback paths, a forward isolator can be transformed to a negative reverse isolator;

FIGS. 6*a* and 6*b* illustrate feedback provisions different than those in FIGS. 5*a* and 5*b* whereby a forward isolator can be transformed to a negative reverse isolator;

FIGS. 7*a* and 7*b* illustrate a further feedback arrangement whereby a forward isolator can be transformed into a negative reverse isolator;

FIGS. 8*a* and 8*b* illustrate that by proper selection of series and parallel feedback, an isolator can be transformed to a stable gyrator;

FIGS. 9*a* and 9*b* illustrate that by proper selection of series and parallel feedback paths, an isolator can be transformed into a second isolator; and FIGS. 10*a* and 10*b* illustrate that by proper selection of series and parallel feedback paths, a gyrator can be transformed to a second gyrator.

Referring to FIG. 1 there is therein illustrated by the general reference character 1, a four pole network. The network 1 may comprise a four pole isolator, reverse isolator or gyrator circuit. In FIG. 1 the network 1 includes a conventional four pole isolator circuit, represented by the broken line box diagram 2, a parallel feedback path P and a series feedback path S. Though the network 1 incorporates a four pole isolator circuit for the illustration of FIG. 1 it will become apparent that the ultimate electrical characteristics are dependent on the values of P and S. Also, it is to be understood at the outset, that the isolator 2 is merely shown for illustrative purposes and that there are numerous isolator circuits available, as previously defined, that satisfy the needs of the present invention. Such isolators include cascaded-multiple-stage amplifiers incorporating common collector, common emitter or common base stages.

The four pole isolator 2 as used for illustrative purposes herein has a pair of input terminals 3 and 4 and a pair of output terminals 5 and 6. The input terminal 3 is connected in series with a blocking capacitor 7 and a base 8 of a transistor 9. The input terminal 3 and the capacitor 7 are also connected to a variable resistor 10, the opposite terminal of which is connected to the input terminal 4. The variable resistor 10 determines the input impedance $R_1$ of the isolator 2. The transistor 9 has an emitter 11 connected to the input terminal 4. A collector 12 of the transistor 9 is connected to a collector working resistor 13 and a blocking capacitor 14. Between the base 8 and the resistor 13 is a variable resistor 15 which is a factor in determining the gain of the circuit 2. Across the ollector working resistor 13 and the input terminal 4 is a power source 16. Completing the isolator network 2 is a variable resistor 17 connected in series with the capacitor 14 and the output terminal 5. The resistor 17 may be utilized to adjust the output impedance of the isolator circuit 2. The input impedance of the isolator 2 looking into the terminals 3 and 4 is represented by $R_1$.

The four pole network 1 has a pair of input poles (terminals) 20 and 21 and a pair of output poles (terminals) 22 and 23. In FIG. 1 the input pole 20 is common with the input terminal 3 of the isolator 2, and the output pole 22 is common with the output terminal 5 of the isolator 2. Joining the output terminal 6 and the input terminal 4 of the isolator 2 is a conductor lead 24. It will be apparent from the isolator 2 that the terminals 4 and 6 are internally joined and that as shown in FIG. 1 the conductor lead 24 serves no purpose. However, the lead 24 is included to illustrate that the series feedback path, considered as a four pole, is connected in series with the isolator circuit. In such cases it may be necessary to have the conductor lead 24. Connected between the input pole 20 and the output pole 22 is a resistive path P. Also joining the input pole 21 and the output pole 23 is a conductor lead 25. Joining the conductor leads 24 and 25 is a resistive path S, thus completing the circuitry of the four pole network 1.

The input to the network 1 is received between the input poles 20 and 21, as so designated by the INPUT arrowed line. The output is received between the output poles 22 and 23, as so designated by the OUTPUT arrowed line. Across the output poles is connected a load device as designated by the symbol $Z_L$.

Examination of FIG. 1 at first reveals that if S is a short circuit, and P an open circuit, the performance of the four pole network 1 is identical to that of the isolator 2. However, it will be shown that by proper selection of values for P and S, in relationship to the input impedance of the isolator 2, the four pole network 1 will operate as a gyrator or an isolator depending upon the selected values. Furthermore, once the network 1 of FIG. 1 is transformed by proper arrangement of P and S a second time, the network 1 can be changed to the original or to a third characteristic.

Before illustrating the transformations of the circuit network 1, it need be realized that the initial network 1 need not necessarily include an isolator as shown by the isolator 2 of FIG. 1, but may start with a gyrator. The gyrator may result from a transformation of the network 1 of FIG. 1 or may be another four pole network, e.g. the gyrator network 30 of FIG. 3 which is shown herein to illustrate one of the gyrator circuits available. The four pole gyrator of FIG. 3 includes a pair of input terminals 31 and 32 to receive input signals and a pair of output terminals 33 and 34 across which may be tied an electrical load. The input terminals 31 and 32 are connected in series with a resistor 35 and a primary winding 36 of a transformer 37. The transformer 37 has a secondary winding 38 connected across the input terminals 39 and 40 of an amplifier 41. The amplifier 41 has a pair of output terminals 42 and 43. The terminal 42 is connected to a center tap terminal 44 of a primary winding 45 of a transformer 46. Connected in series with the primary winding 45 and the terminal 43 is a resistor 47. The terminal 43 is also common with the output terminal 33. A terminal 48 of the primary winding 45 is common with the output terminal 34. The transformer 46 has a secondary winding 49 which connects across a pair of input terminals 50 and 51 of an amplifier 52. The amplifier 52 has a pair of output terminals 53 and 54. The terminal 53 is common to the input terminal 32 and the terminal 54 is attached to a center tap terminal 55 of the primary winding 36. The characterizing impedance of the gyrator of FIG. 3 will be designated as R (not shown).

FIG. 2*a* illustrates the four terminal network 1 as including a four pole gyrator. In the definitions a gyrator is defined in mathematical terms as a device having an impedance matrix of $$||Z||=\begin{Vmatrix} 0 & R \\ R & 0 \end{Vmatrix}$$

The impedance matrix of a reverse isolator is defined as $$||Z||=\begin{Vmatrix} R_1 & -2R_1 \\ 0 & -R_1 \end{Vmatrix}$$

Now viewing FIG. 2*a*, wherein the parallel feedback path P has a value —R, and assuming the forward direction is from the input poles 20 and 21 to the output poles 22 and 23, the total impedance matrix of the four pole network 1 becomes $$\begin{Vmatrix} -R & 2R \\ 0 & R \end{Vmatrix}$$

which is the matrix of a negative reverse isolator. Thus, by making the series feedback path S of FIG. 1 a short circuit and the parallel feedback path P a negative resistance equal in magnitude to the gyrator characterizing impedance, a four pole network 1 have gyrator characteristics as shown in FIG. 2*a* is transformed into a four pole negative reverse isolator network having an input impedance $R_1$ equal to the negative characterizing R of the initial gyrator circuit.

FIGS. 4*a* and 4*b* illustrate a four pole network 1 having an infinite parallel feedback path so that the P of FIG. 1 appears as an open circuit. The series feedback path S has a negative resistance value —R such that the composite circuit of FIG. 4*a* is equivalent to a four pole negative reverse isolator as shown in FIG. 4*b*. As a result of FIGS. 2*a* and 2*b* and FIGS. 4*a* and 4*b*, it may be noted that by starting with a four pole network 1 having characteristics corresponding to a gyrator and providing either a parallel or a series feedback path with a negative resistance of a magnitude equal to the characterizing impedance of the gyrator, the initial four pole network 1 is transformed to a negative reverse isolator having an input impedance equal to the negative characterizing impedance of the gyrator.

FIG. 5*a* illustrates the situation when the four pole network 1 is comprised of a four pole forward isolator 2, zero series feedback, and a parallel negative resistive feedback path equal in magnitude to one-half the input impedance of the isolator, i.e. $P=-R_1/2$. The combination transforms the four pole network 1 into a negative reverse isolator as shown in FIG. 5*b*.

FIG. 6*a* illustrates the situation when the four pole network 1 includes a four pole forward isolator 2, an open parallel feedback path P, and a series feedback path S equal to $-2R_1$. The combination transforms the four pole network 1 into a negative reverse isolator as shown in FIG. 6*b*.

FIG. 7*a* illustrates the situation where the four pole network 1 includes a four pole forward isolator 2, a parallel negative resistive feedback path equal in magnitude to the input impedance of the isolator, i.e. $P=-R_1$, and a series negative resistance feedback path equal in magnitude to the input impedance of the isolator i.e. $S=-R_1$. Thus, in each feedback path there is incorporated a negative resistance device having a magnitude equivalent to the magnitude of the input impedance of the four pole isolator. The combination transforms the four pole network 1 into a four pole negative reverse isolator as shown in FIG. 7*b*, and an input impedance corresponding to the negative of that of the initial circuit.

Thus, the FIGS. 5*a* and 5*b*, 6*a* and 6*b*, and 7*a* and 7*b* illustrate the four pole network 1 in various combinations of negative resistive feedback paths and four pole forward isolators to provide four pole negative reverse isolators.

The arrangement of FIG. 8*a* shows the four pole network 1 with the forward isolator 2 wherein the parallel resistive feedback path has a value $-2R_1$ and the series feedback path a value $-R_1/2$. The combination transforms the characteristics of the network 1 to that of a gyrator, as shown in FIG. 8*b*. However, by making the parallel feedback resistance $-2R_1$ and the series resistance path $-R_1/2$, it will be appreciated that if there are changes in resistance values of the feedback paths, e.g. as may occur with aging or temperature, and if the changes in both path are in the same direction, the changes tend to cancel each other so that a stable four pole gyrator is realized.

The arrangement of FIG. 9*a* illustrates that if the four pole network 1 incorporates the four pole isolator 2 and provides both parallel and series feedback the four pole 1 is transformed to another four pole forward isolator. In this case, however, each feedback path has a resistive value of a magnitude approximately equal to the input impedance $R_1$ of the isolator 2. It shall be noted, however, when one feedback path is negative the other is positive.

The diagrams of FIGS. 10*a* and 10*b* illustrate that if the four pole network 1 includes a gyrator rather than an isolator as shown in FIG. 9*a*, that the combination of a negative parallel feedback path $-R_1$, along with a positive series feedback path $R_1$, or vice versa, that the initial four pole is transformed to another gyrator.

The versatility and flexibility of the gyrator-isolator four pole network 1 should be noted. For example, if the network starts with a conventional four pole isolator circuit having predominantly resistive input impedance, the electrical characteristics of the network may be changed to that of a four pole gyrator merely by changing the external feedback parameters (see FIGS. 8*a* and 8*b*). If it is then desired that the network 1 have characteristics corresponding to a four pole isolator, the same feedback parameters are then altered a second time. (See FIGS. 2*a* and 2*b*, and 4*a* and 4*b*.) If it is then desirable to have the network 1 perform as a four pole isolator, but as a negative reverse isolator, the same feedback parameters are changed a third time (see FIGS. 5*a* and 5*b*, 6*a* and 6*b*, and 7*a* and 7*b*). Obviously there are numerous combinations and transformations that may be made from the four pole network 1.

I claim:

1. An electronic circuit for transforming the inherent electrical characteristics of on isolator network to that of a gyrator, the combination of:

- a four pole network having a pair of input poles and a pair of output poles, said network exhibiting isolator characteristics and having a predominantly resistive input impedance;
- a parallel resistive feedback path having negative resistance and extending between one of said input terminals and one of said output terminals, the magnitude of the negative resistance value of said parallel resistive path being approximately twice the resistive input impedance of said network;
- a series resistive feed back path having negative resistance connected at one end to both the other input and output poles and providing a circuit terminus at its opposite end, the magnitude of the negative resistance value of said series resistive path being approximately one-half the resistive input impedance of said network, said resultant circuit being a stabilized gyrator.

2. In a circuit as in claim 1 wherein the parallel resistive feedback path and the series resistive feedback path have comparable resistance-value changing characteristics.

3. An electronic circuit for transforming the inherent electrical characteristics of an isolator network comprising, in combination:

a four pole network having a pair of input poles and a pair of output poles, the network exhibiting isolator characteristics having a predominantly resistive input impedance;

a pair of resistive paths having negative resistances, the magnitude of the resistance value of each path being substantially equal to one another and approximately equal to the resistive input impedance of the network, one of said paths being connected between one of said input poles and one of said output poles, the other of said paths being connected at one end to both the other input pole and the other output pole and providing a circuit terminus at its opposite end, said resultant circuit being a negative reverse isolator.

4. An electronic circuit for transforming the inherent electrical characteristics of an isolator network comprising, in combination:

a four pole network having a pair of input poles and a pair of output poles and which network exhibits isolator characteristics;

a pair of resistive paths having negative resistance values, one of the paths having a magnitude approximately four times the value of the other path, the larger path being connected between one of said input poles and one of said output poles, the smaller of said paths being connected at one end to both of the other input poles and the other output pole and providing a circuit terminus at its opposite end, said resultant circuit being a gyrator.

5. An electronic circuit for transforming the inherent electrical characteristics of an isolator network comprising, in combination:

a four pole network having a pair of input poles and a pair of output poles, the network exhibiting isolator characteristics having a predominantly resistive input impedance;

a resistive path having a negative resistance of a magnitude approximately twice the input impedance of said isolator, one end of the resistance path joining one of said input poles and one of said output poles and the other end of said path providing a circuit terminus, said resultant circuit being a negative reverse isolator.

6. An electronic circuit for transforming the inherent electrical characteristics of an isolator network comprising, in combination:

a four pole network having a pair of input poles and a pair of output poles, the network exhibiting isolator characteristics having a predominantly resistive input impedance;

a resistive path having a negative resistance of a magnitude approximately one-half the input impedance of the isolator, one end of the resistance path joining one of said input poles and the other end of said path joining one of said output poles, said resultant circuit being a negative reverse isolator.

7. An electronic circuit for transforming the inherent electrical characteristics of an isolator network comprising, in combination:

a four pole network having a pair of input poles and a pair of output poles, the network exhibiting isolator characteristics;

a pair of resistive paths, one of said paths having negative resistance and the other of said paths having positive resistance, one of said resistive paths being connected between one of said input poles and one of said output poles, and the other of said resistive paths being connected at one end to both of the other input and output poles and providing a circuit terminus at its opposite end, said resultant circuit having isolator characteristics corresponding to that of the four pole network.

8. In a circuit as in claim 7 wherein the magnitude of the resistance values of each of the resistive paths is approximately equal to the input impedance of the four-pole isolator network.

References Cited by the Examiner

UNITED STATES PATENTS

| | | | |
|---|---|---|---|
| 2,794,864 | 6/1957 | Shockley | 333—80 X |
| 3,160,823 | 12/1964 | Christensen | 330—6 |

HERMAN KARL SAALBACH, *Primary Examiner.*

P. L. GENSLER, *Assistant Examiner.*